US008332755B2

(12) United States Patent
Zhang et al.

(10) Patent No.: US 8,332,755 B2
(45) Date of Patent: Dec. 11, 2012

(54) FORCE-FEEDBACK WITHIN TELEPRESENCE

(75) Inventors: Zhengyon Zhang, Bellevue, WA (US); Xuedong D. Huang, Bellevue, WA (US); Jin Li, Sammamish, WA (US); Rajesh Kutpadi Hegde, Redmond, WA (US); Kori Marie Quinn, Redmond, WA (US); Michel Pahud, Redmond, WA (US); Jayman Dalal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 12/472,579

(22) Filed: May 27, 2009

(65) Prior Publication Data

US 2010/0306647 A1   Dec. 2, 2010

(51) Int. Cl.
*G06F 3/01* (2006.01)
*G06F 3/048* (2006.01)
(52) U.S. Cl. .................. 715/701; 715/757; 715/753
(58) Field of Classification Search .......... 715/701, 715/702, 733, 751, 753, 757, 764, 765; 345/156, 345/163
See application file for complete search history.

(56) References Cited

U.S. PATENT DOCUMENTS

| | | | |
|---|---|---|---|
| 6,132,368 A | 10/2000 | Cooper | |
| 6,310,941 B1 | 10/2001 | Crutcher et al. | |
| 6,625,812 B2 | 9/2003 | Abrams et al. | |
| 6,847,391 B1 | 1/2005 | Kassatly | |
| 6,957,186 B1 | 10/2005 | Guheen et al. | |
| 7,007,235 B1* | 2/2006 | Hussein et al. | 715/751 |
| 7,206,809 B2 | 4/2007 | Ludwig et al. | |
| 7,299,405 B1 | 11/2007 | Lee et al. | |
| 7,428,000 B2 | 9/2008 | Cutler et al. | |
| 7,478,129 B1* | 1/2009 | Chemtob | 709/204 |
| 7,590,941 B2* | 9/2009 | Wee et al. | 715/753 |
| 2003/0158900 A1 | 8/2003 | Santos | |
| 2004/0199580 A1 | 10/2004 | Zhakov et al. | |
| 2005/0021618 A1 | 1/2005 | Isozaki | |
| 2005/0278446 A1 | 12/2005 | Bryant | |

(Continued)

FOREIGN PATENT DOCUMENTS
WO   WO2008101117 A1   8/2008

OTHER PUBLICATIONS

Bergamasco, "Design of Hand Force Feedback Systems for Glove-like Advanced Interfaces", retrieved on Jan. 7, 2009 at <<http://ieeexplore.ieee.org/stamp/stamp.jsp?arnumber=00253873>>, IEEE International Workshop on Robot and Human Communication, IEEE, Sep. 1992, pp. 286-293.

(Continued)

*Primary Examiner* — Xiomar L Bautista
(74) *Attorney, Agent, or Firm* — Lee & Hayes, PLLC

(57) ABSTRACT

The claimed subject matter provides a system and/or a method that facilitates replicating a telepresence session with a real world physical meeting. A telepresence session can be initiated within a communication framework that includes two or more virtually represented users that communicate therein. A trigger component can monitor the telepresence session in real time to identify a participant interaction with an object, wherein the object is at least one of a real world physical object or a virtually represented object within the telepresence session. A feedback component can implement a force feedback to at least one participant within the telepresence session based upon the identified participant interaction with the object, wherein the force feedback is employed via a device associated with at least one participant.

20 Claims, 9 Drawing Sheets

U.S. PATENT DOCUMENTS

| | | | |
|---|---|---|---|
| 2006/0210045 A1* | 9/2006 | Valliath et al. | 379/202.01 |
| 2006/0224430 A1 | 10/2006 | Butt | |
| 2007/0233785 A1 | 10/2007 | Abraham et al. | |
| 2007/0282661 A1 | 12/2007 | Franco | |
| 2008/0012936 A1* | 1/2008 | White | 348/14.16 |
| 2008/0119165 A1 | 5/2008 | Mittal et al. | |
| 2008/0152113 A1 | 6/2008 | Chang et al. | |
| 2008/0320040 A1* | 12/2008 | Zhurakhinskaya | 707/104.1 |
| 2010/0097441 A1* | 4/2010 | Trachtenberg et al. | 348/14.08 |
| 2010/0251142 A1* | 9/2010 | Geppert et al. | 715/758 |
| 2010/0306647 A1 | 12/2010 | Zhang et al. | |
| 2011/0045910 A1* | 2/2011 | McKenna et al. | 463/42 |

OTHER PUBLICATIONS

Caldwell, et al., "Telepresence Feedback and Input Systems for a Twin Armed Mobile Robot", retrieved on Jan. 7, 2009 at <<http://ieeexplore.ieee.org/stamp/stamp.jsp?arnumber=00540147>>, IEEE Robotics & Automation Magazine, IEEE, Sep. 1996, pp. 29-38.

Final Office Action for U.S. Appl. No. 12/399,518, mailed Jun. 9, 2011, Rajesh Kutpadi Hegde, "System and Method that Facilitates Enhancing the Employment of Telepresence Sessions", 29 pgs.

Bergamasco, "Design of Hand Force Feedback Systems for Glove-like Advanced Interfaces", retrieved on Jan. 7, 2009 at <<http://ieeexplore.ieee.org/stamp/stamp.jsp?arnumber=00253873>>, IEEE International Workshop on Robot and Human Communication, IEEE, 1992, pp. 286-293.

Fisch, et al., "Haptic Devices for Virtual Reality, Telepresence and Human-Assistive Robotics", retrieved on Jan. 7, 2009 at <<http://www.princeton.edu/~jmelli/papers/ch4-haptics.pdf>>, Chapter 4, pp. 4-1 to 4-24.

French, et al. "A System for Multi-Axial Subassemblage Testing (Mast): Design Concepts and Capabilities", retrieved on Nov. 25, 2008 at <<http://nees.umn.edu/publications/011001_7NCEE_MAST_Paper.pdf>>, 10 pages.

Haans, et al., "Mediated Social Touch: A Review of Current Research and Future Directions", retrieved on Jan. 7, 2009 at <<http://www.antalhaans.nl/files/HaansIJsselsteijn2006mst.pdf>>, pp. 1-27.

Lee, et al., "Effects of Haptic Feedback on Telepresence and Navigational Performance", retrieved on Jan. 7, 2009 at <<http://www.vrsj.org/ic-at/papers/2004/S4-4.pdf>>, ICAT, 2004, 8 pages.

Sallnas, et al., "Supporting Presence in Collaborative Environments by Haptic Force Feedback", retrieved on Jan. 7, 2009 at <<http://www.certec.lth.se/doc/supportingpresence/supportingpresence.pdf>>, ACM Transactions on Computer-Human Interaction, vol. 7, No. 4, Dec. 2000, pp. 461-476.

Stone, "Haptic Feedback: A Potted History, From Telepresence to Virtual Reality", retrieved on Jan. 7, 2009 at <<http://www.dcs.gla.ac.uk/~stephen/workshops/haptic/papers/stone.pdf>>, pp. 1-7.

"The NEES Cyberinfrastructure Center (NEESit) E-Newsletter Provides IT-Related News to the NEES Community", retrieved on Nov. 25, 2008 at <<http://it.nees.org/about/news/seismos/2008-03.pdf>>, Mar. 2008, 5 pages.

Ueberle, et al., "Haptic Feedback Systems for Virtual Reality and Telepresence Applications", retrieved on Jan. 7, 2009 at <<http://www.lsr.ei.tum.de/fileadmin/publications/HD-Symp_2006_Ueberle.pdf>>, Institute of Automatic Control Engineering (LSR)—Technische Universitat Munchen, Munich Germany, 9 pages.

\* cited by examiner

FORCE-FEEDBACK WITHIN TELEPRESENCE

CROSS-REFERENCE TO RELATED APPLICATIONS

This application is related to pending U.S. patent application Ser. No. 12/399,518 entitled "SMART MEETING ROOM" filed on Mar. 6, 2009. The entirety of the above-noted application is incorporated by reference herein.

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

In light of such advances in computer technology (e.g., devices, systems, memory, wireless connectivity, bandwidth of networks, etc.), mobility for individuals has greatly increased. For example, with the advent of wireless technology, emails and other data can be communicated and received with a wireless communications device such as a cellular phone, smartphone, portable digital assistant (PDA), and the like. As a result, physical presence for particular situations has drastically reduced or been reduced. In an example, a business meeting between two or more individuals can be conducted virtually in which the two or more participants interact with one another remotely. Such virtual meetings that can be conducted with remote participants can be referred to as a telepresence session.

With the intense growth of the Internet, people all over the globe are utilizing computers and the Internet to conduct telepresence sessions. Traditional virtual meetings include teleconferences, web-conferencing, or desktop/computer sharing. Yet, each virtual meeting may not sufficiently replicate or simulate a physical meeting. A virtually represented user can interact and communicate data within a telepresence session by leveraging devices with inputs and outputs. One shortcoming associated with conventional telepresence systems is the inherent restrictions placed upon collaboration participants. In essence, participants are traditionally physically bound to narrow confines about the desktop or other device facilitating the collaboration.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate initiating force physical feedback within a telepresence session. In general, the subject innovation relates to enhancing telepresence sessions by providing as much real physical meeting concepts into the telepresence session. A feedback component and a trigger component can enable the incorporation of feedback for a participant taking part in a session or telepresence meeting. In particular, surfaces can use force feedback in order to communicate contact or interaction with items, people, or data. The trigger component can detect interactions within the telepresence session to which the feedback component can generate a corresponding force feedback to communicate for such interaction. The force feedback can be friction, vibration, haptic, tactile, electric feedback, electrical stimulation, three-dimensional feedback, any suitable combination thereof, etc. The force feedback can further leverage surface-based computing techniques in order to provide a physical contact substantially similar to a real world interaction.

For instance, a participant can feel or receive feedback when physically interacting with another participant. Hugs, hand-shakes, grabbing documents, writing on a whiteboard, and the like can be detected so a specific feedback force response is implemented. In another example, a light hand-shake with a person can have a light force feedback while a hard handshake can have a hard force feedback. In other aspects of the claimed subject matter, methods are provided that facilitate utilizing a device to implement a force physical feedback based upon an identified interaction to a user participating within a telepresence session.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
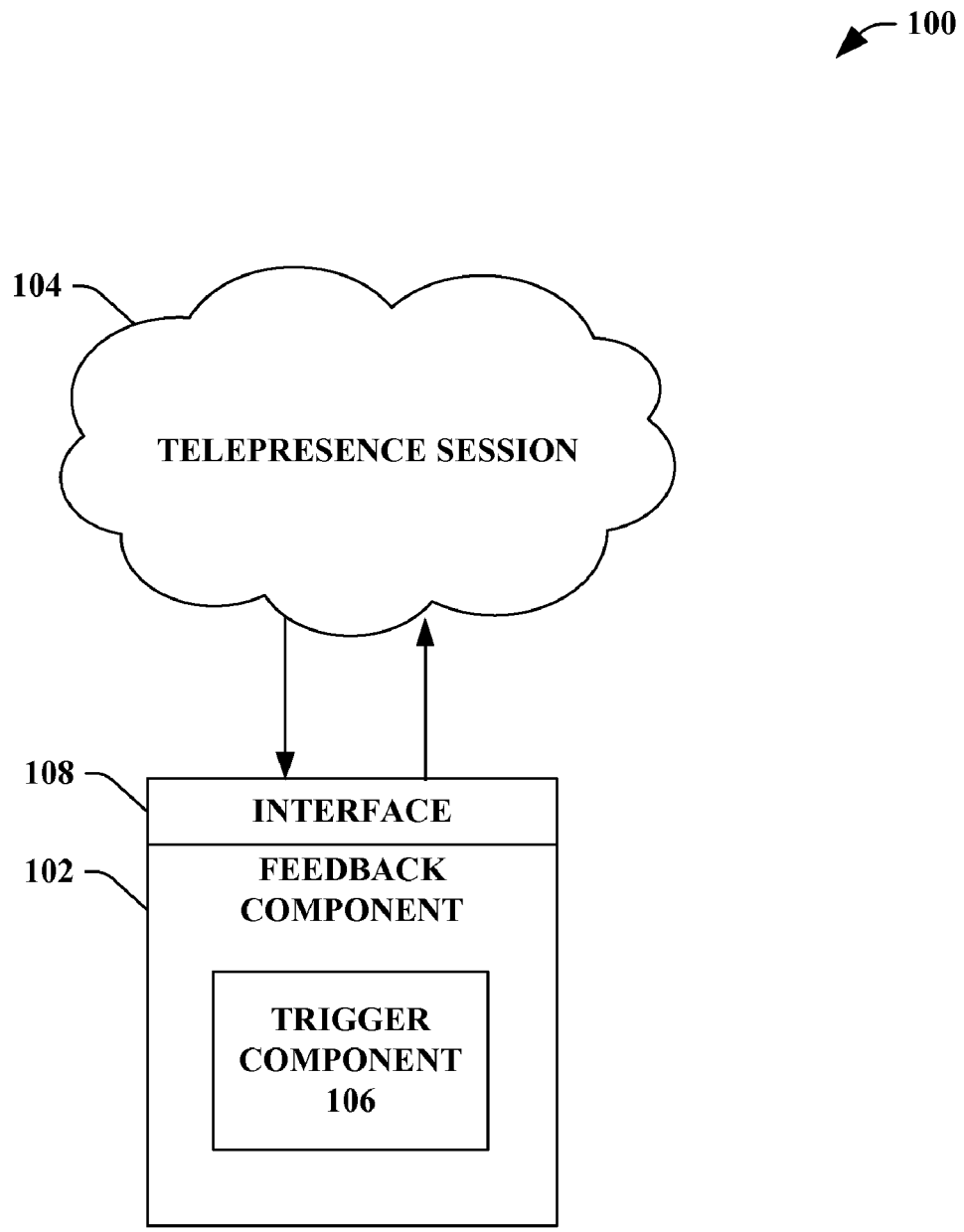
FIG. 1 illustrates a block diagram of an exemplary system that facilitates identifying a trigger to employ a force feedback within a telepresence session.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "session," "device," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates identifying a trigger to employ a force feedback within a telepresence session. In general, the system 100 can generate a force feedback to a participant within a telepresence session 104 in order to replicate a physical interaction with an object and/or virtual user. For example, the object can be a real world physical object or a virtually represented object within the telepresence session 104. The system 100 can include a feedback component 102 that can generate a force feedback response for a participant within the telepresence session 104 based upon a detected trigger or cue. In particular, the system 100 can include a trigger component 106 that can monitor activity within the telepresence session 104, wherein the activity can be, but is not limited to, virtual presence location within the telepresence session 104, virtual presence proximity to virtually represented objects, interaction with virtually represented object, interaction with physical objects, physical interaction, virtual interaction, and the like. Thus, the trigger component 106 can detect general interaction such as, for instance, participant interaction with an object. The feedback component 102 can generate a force feedback in response to a detected participant interaction with the object in order to enhance the simulation capabilities of the telepresence session 104.

For example, a first user located in Cleveland, Ohio and a second user located in Seattle, Wash. can be virtually represented within a telepresence session respectively. The subject innovation can enable the first user to interact with the second user and/or objects associated with the telepresence session, wherein such interaction can be communicated with a force feedback. Thus, the first user can shake hands with the second user and such interaction can be translated and communicated to the first user and the second user with a force feedback. In addition, the first user can move a virtually represented object within the telepresence in which such interaction can be translated and communicated to the first user with a force feedback. Still further, a third user can be within physical proximity and located with the first user, wherein the third user can be virtually represented within the telepresence session. Moreover, the third user can interact with virtually represented users and/or objects within the telepresence session that can trigger a force feedback regardless of the physical geographic proximity in comparison to other participants. Moreover, it is to be appreciated that the level or intensity of an interaction can be replicated and communicated accordingly.

In another example, the resulting force can be combined when two or more participants apply a force at the same time to a shared object that has physical resistance. For example, if participant A and participant B apply at the same time a force to an object, participant C could get the resulting force or a feedback proportional to that. If then participant C pushes back on this object, participant A and B would feel it like if participants A, B and C were in the same room sharing the same object. Moreover, in yet another example, a participant can pick which participant(s) will get the force feedback during a telepresence session. For example, if participant A and B have a side conversation using a whiteboard device, the vibration of the whiteboard will not be perceived by the other participants.

The feedback component 102 can generate any suitable force feedback in response to a detected cue or trigger related to an interaction with virtual users, physical users, virtual objects, and/or physical objects. For example, the feedback can be, but is not limited to being, friction, haptic, tactile, electric feedback, electrical stimulation, three-dimensional feedback, vibration, shaking, physical resistance, temperature change, motion, noise, pressure, texture, a motion, a replication of touching, any combination thereof, and/or any other suitable feedback communicated via a device. Moreover, it is appreciated that the interaction that can trigger force feedback can be any suitable interaction such as, but not limited to, virtual user to virtual user, physical user to virtual user, physical user to physical user, virtual user to data, physical user to data, virtual user to physical object, physical user to physical object, etc.

The telepresence session 104 (discussed in more detail in FIG. 5) can be a virtual environment in which two or more virtually represented users can communicate utilizing a communication framework. In general, a physical user can be represented within the telepresence session 104 in order to communicate to another user, entity (e.g., user, machine, computer, business, group of users, network, server, enterprise, device, etc.), and the like. For instance, the telepresence session 104 can enable two or more virtually represented users to communicate audio, video, graphics, images, data, files, documents, text, etc. It is to be appreciated that the subject innovation can be implemented for a meeting/session in which the participants are physically located within the same location, room, or meeting place (e.g., automatic initiation, automatic creation of summary, etc.).

In addition, the system 100 can include any suitable and/or necessary interface component 108 (herein referred to as "the interface 108"), which provides various adapters, connectors, channels, communication paths, etc. to integrate the feedback component 102 into virtually any operating and/or database system(s) and/or with one another. In addition, the interface 108 can provide various adapters, connectors, channels, communication paths, etc., that provide for interaction with the feedback component 102, the telepresence session 104, the trigger component 106, and any other device and/or component associated with the system 100.

In a telepresence session (or more broadly telecommunication and telecollaboration) there can be a network delay, which may lead to unnaturalness in human-human interaction. Some research shows that the acceptable round-trip delay is about 30 to 60 ms for feedback force. To achieve this, the subject innovation can employ an anticipation and prediction mechanism. Anticipation can be provided in which that even before a user exerts a force, an anticipated force signal is sent to remote sides. Prediction can be employed during the exertion of force. The system 100 can predict what the force strength is in a short future based on the past data, and sends the predicted force signal to the remote sides.

Figure 2:
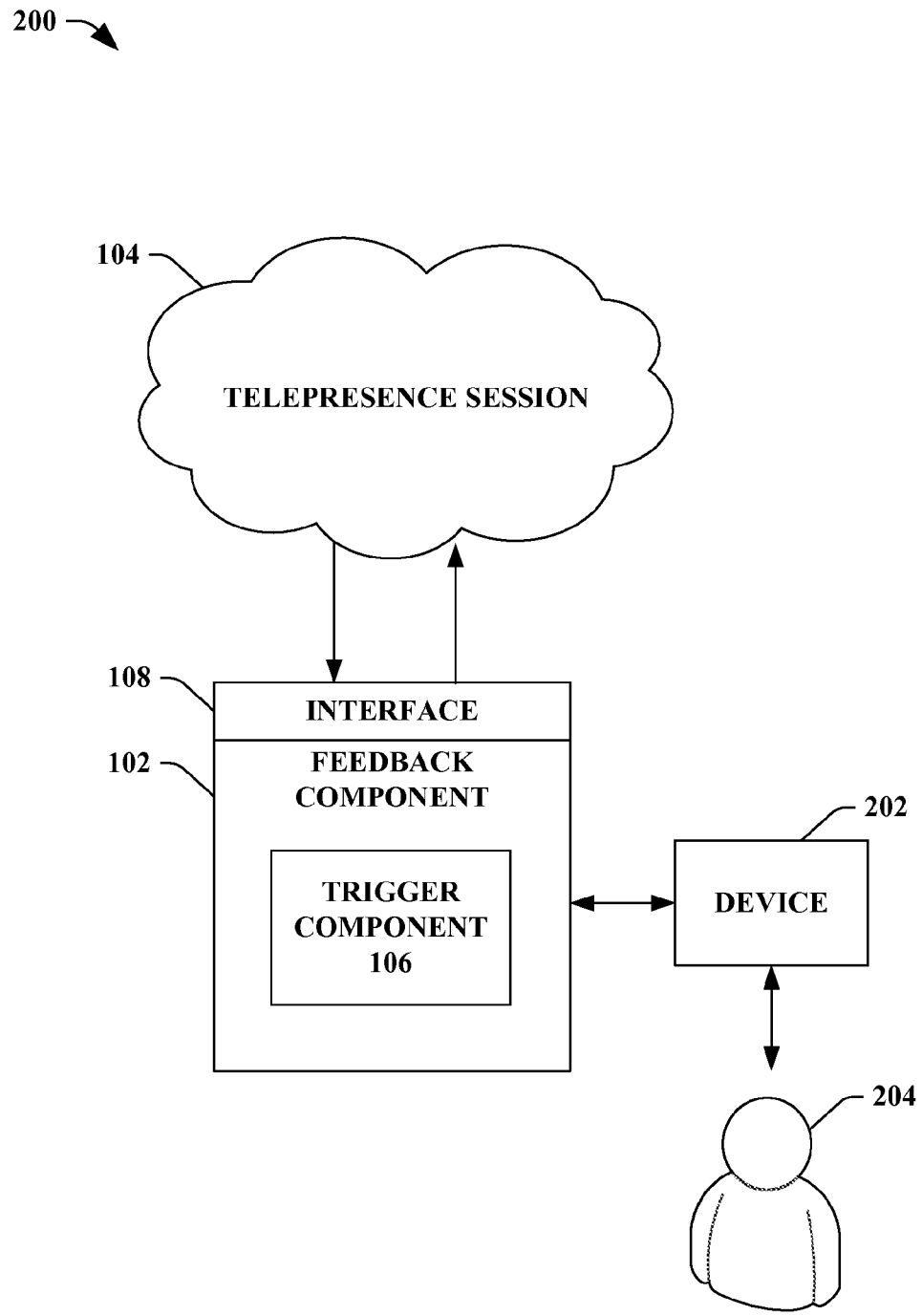
FIG. 2 illustrates a block diagram of an exemplary system that facilitates utilizing a device to implement a force physical feedback based upon an identified interaction to a user participating within a telepresence session.

FIG. 2 illustrates a system 200 that facilitates utilizing a device to implement a force physical feedback based upon an identified interaction to a user participating within a telepresence session. The system 200 can include the trigger component 106 that can monitor interactions of virtually represented participants and/or objects, wherein the feedback component 102 can generate a force feedback based upon such detected interactions. In general, the system 200 can replicate real world physical interactions within the telepresence session 104. For example, a user virtually represented within the telepresence session 104 can tap another virtually represented user on the shoulder. The system 200 can detect such interaction between the virtually represented users and implement a force feedback to the virtual user tapping and the virtual user being tapped.

The feedback component 102 can implement a force feedback for various detected interactions. The interaction can be a user to user interaction (e.g., physical user, virtually represented user, etc.). The interaction can be a data interaction, wherein the interaction with data can initiate moving data within the telepresence session 104 and/or delivering data (e.g., emailing data, printing data, displaying data, etc.). For example, a user can grab a document within the telepresence session and push the document to another user in order to deliver the document. The grabbing and pushing of the document can include force feedback based at least in part with the interaction with the data. Furthermore, the interaction can be a change in events such as a change in the telepresence session 104. For example, the change in the telepresence session 104 can be a mood change (e.g., agitation, tension, annoyance, agreement, confusion, etc.), a new topic being presented, a person leaving the session, a person entering the session, alerts (e.g., changes in speaker, etc.), etc. For example, a force feedback can be communicated to users based upon a mood change from open communication to tension and frustration.

The feedback component 102 can receive a trigger or cue from the trigger component 106 that an interaction has been detected, wherein such trigger or cue can initiate a physical, force feedback to a user 204 via a device 202. In other words, the device 202 can include at least one output that can communicate a force physical feedback to the user 204 based at least in part upon the detected trigger, the cue (e.g., the interaction detected in real time by the trigger component 106), or the feedback component 102. The device 202 can be any suitable device, component, apparatus, or system that can communicate force feedback to the user 204. For example, the device 202 can be, but is not limited to being, a haptics device, a haptics glove, a pressure sensor device, a three-dimensional (3D) camera, a speaker, a whiteboard, a vibration device, a heater, a motor, a device that can replicate a touching from a user, a friction device, a tactile device, a 3D device, etc. Additionally, although one device 202 is illustrated, it is to be appreciated that any suitable number of devices 202 can be utilized with the subject innovation in order to communicate a force feedback to the user 204.

The feedback component 102 can automatically select and utilize a particular device or devices in order to accurately communicate a force feedback. Thus, the feedback component 102 can evaluate the available devices 202 as well as the respective outputs that can communicate force feedback and select a device 202 or set of devices 202 that can optimally communicate the detected interaction that is to be replicated. It is to be appreciated that the selection of the device(s) for communication of the force feedback can be based upon evaluation of characteristics such as, but not limited to, device output capability, user preferences, type of force feedback, interaction detected, interaction intensity, etc. For example, a user can receive outputs from device A, device B, and device C and a device or a collection of the devices can be selected to communicate the force feedback based upon evaluated characteristics.

Moreover, it is to be appreciated that the user 204 can be any suitable user that can be virtually represented within the telepresence session 104. Although a single user is illustrated, the subject innovation can include any number of users. In general, the user 204 can be, but is not limited to being, a group of users, a company, an enterprise, a machine, any suitable entity that can be virtually represented within the telepresence session 104, an object, and the like. For example, the device 202 can communicate a touching feeling (e.g., replicating a detected interaction that corresponds to a touching feeling) to a group of users 204 that collectively represent a single entity (e.g., company, group of people, advisor, surrogate, attorney, etc.).

Figure 3:
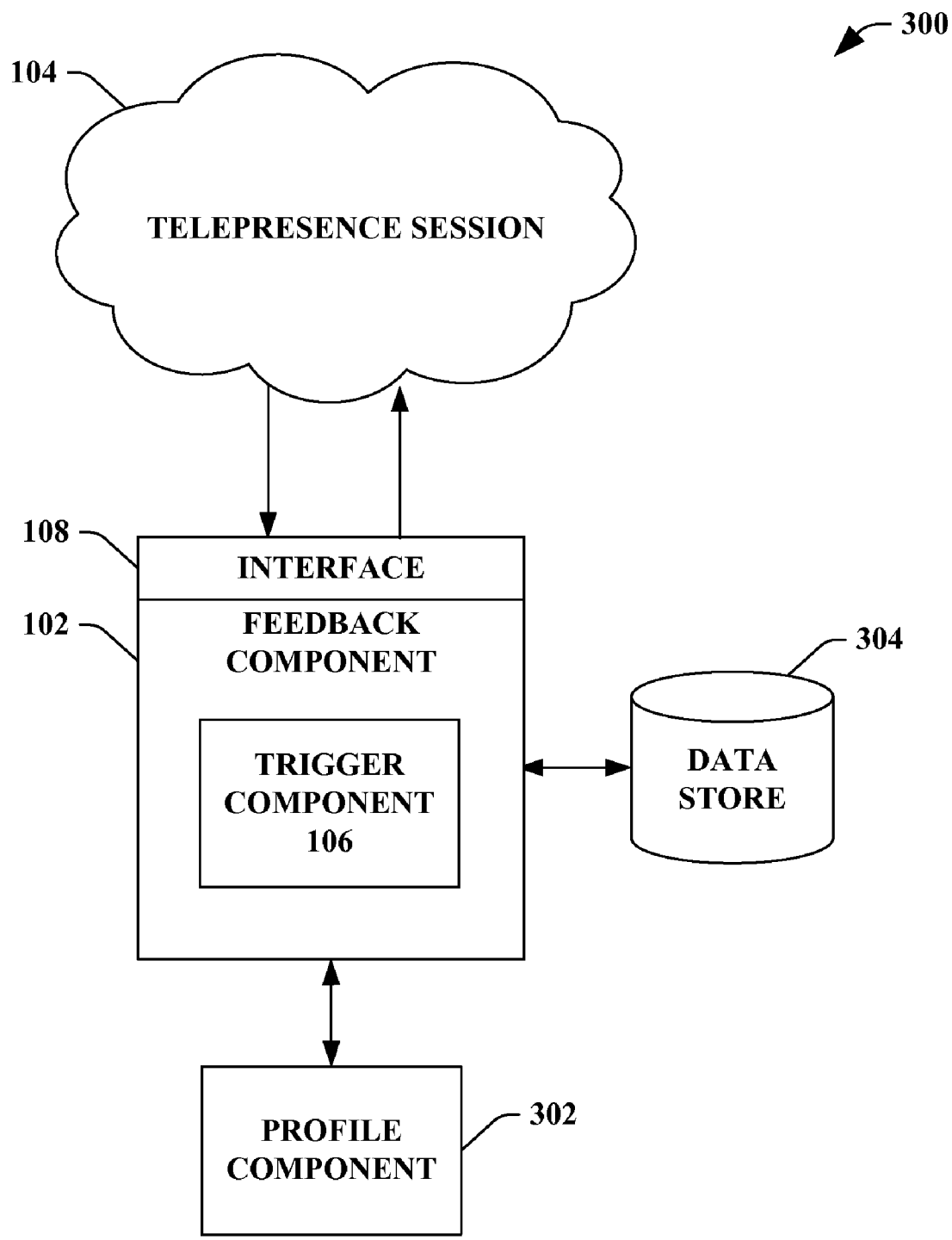
FIG. 3 illustrates a block diagram of an exemplary system that facilitates providing force feedback to a telepresence session participant in accordance with a user profile setting.

FIG. 3 illustrates a system 300 that facilitates providing force feedback to a telepresence session participant in accordance with a user profile setting. The system 300 can include the feedback component 102 can generate a force feedback to a user virtually represented within the telepresence session 104 in response to a detected interaction within the telepresence session 104. The trigger component 106 can identify an interaction that can correspond to physical touching in the real world. For example, the interaction can be user to user (e.g., virtual user, physical user, etc.), the interaction can be with data (e.g., interaction with data to trigger delivery of data, moving data, etc.), and the interaction can be associated with a change in events (e.g., room/session change, mood change, agitation, annoyance, tension, etc.).

The system 300 can further include a profile component 302 that can manage a specific user profile for a user that is virtually represented within a telepresence session 104. The profile component 302 can include settings, configurations, preferences, and the like in regard to the telepresence session 104 and, in particular, the management of communicating force feedback to himself or herself, or others. The profile component 302 can include user preferences related to device availability in which a user can prioritize which devices can be utilized to communicate force feedback as well as settings for outputs on such devices. The profile component 302 can further include a cultural setting that can be set to a specific culture related to a user. For example, a tag on a shoulder might be ok in some cultures but not in others and could be automatically translated to a more appropriate feedback accordingly. Moreover, the profile component 302 can enable a user to define a type of force feedback for a type of detected interaction. The user can further define an intensity or setting of the force feedback to other objects/users within the telepresence session 104.

The profile component 302 can further include restrictions defined by a user. The restrictions can be preferences related to force feedback options in which a user can opt out or opt in for certain interactions. In general, the profile component 302 can limit at least one of a received force feedback, a communicated force feedback to a user, an amount of devices used to output a received feedback, a type of force feedback received, a type of force feedback communicated to a user, etc. For example, the profile component 302 can enable a user to have a status of "do not disturb," wherein force feedback can be limited in terms of receipt. The restriction can be related to touch (e.g., limited touch or force feedbacks related to touch, etc.), the restriction can be related to particular devices to communicate interaction (e.g., device A is allowed to communicate interaction, etc.). In general, the user can leverage the profile component 302 in order to manage various settings related to restrictions, the telepresence session 104, and/or force feedback.

The system 300 can further include a data store 304 that can include any suitable data related to the feedback component 102, the trigger component 106, the telepresence session 104, the profile component 302, etc. For example, the data store 304 can include, but not limited to including, user preferences, user profiles, device availability, device output settings, device input settings, triggers, cues, interaction thresholds, force feedback and trigger relationships/definitions, user to user interactions, data interactions, event interactions/detections, force feedbacks, etc.

It is to be appreciated that the data store 304 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 304 of the subject systems and methods is intended to comprise, without being limited to, these and any other suitable types of memory. In addition, it is to be appreciated that the data store 304 can be a server, a database, a hard drive, a pen drive, an external hard drive, a portable hard drive, and the like.

Figure 4:
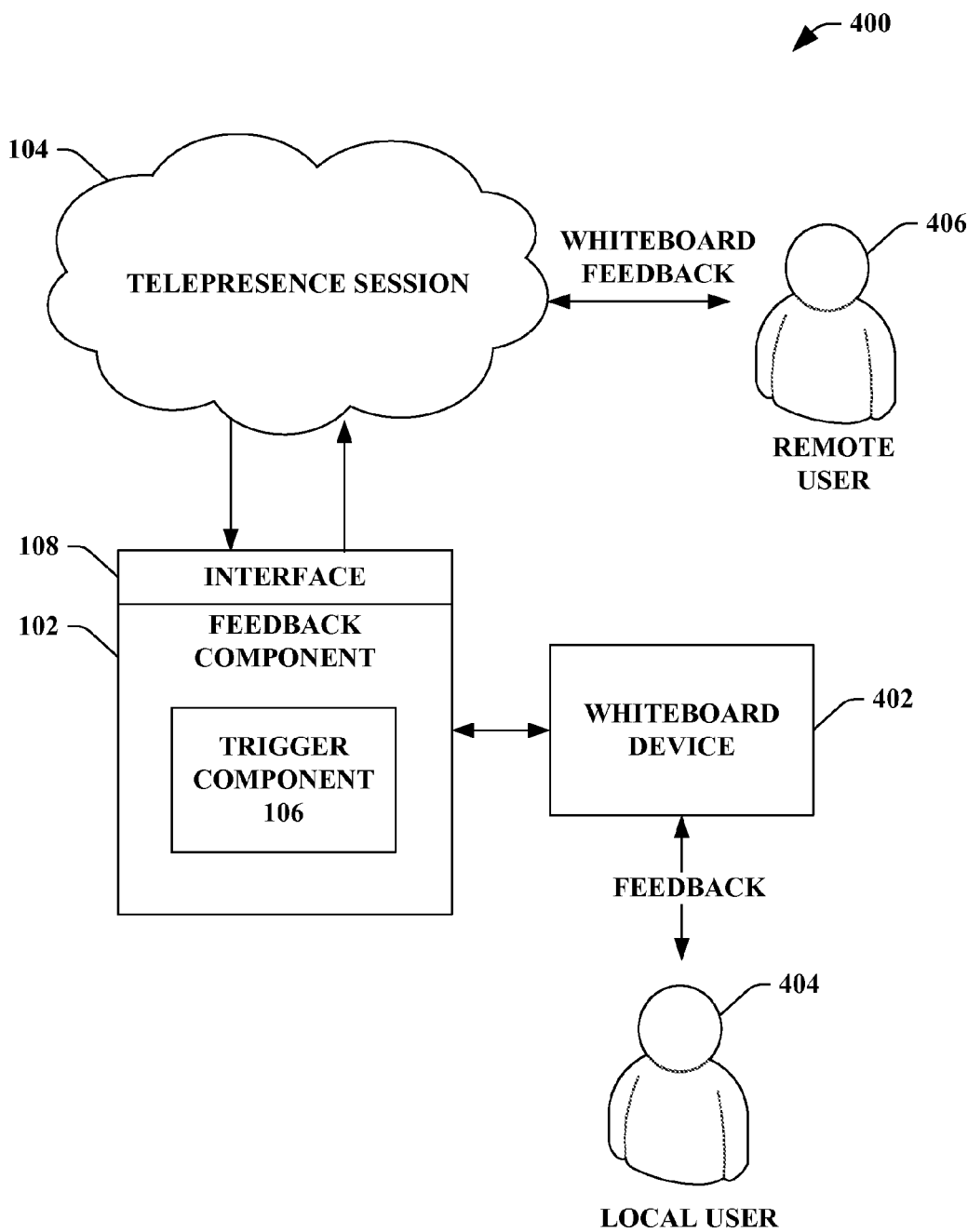
FIG. 4 illustrates a block diagram of an exemplary system that facilitates enhancing physical interaction with a whiteboard device virtually represented within a telepresence session.

FIG. 4 illustrates a system 400 that facilitates enhancing physical interaction with a whiteboard device virtually represented within a telepresence session. The system 400 can include the feedback component 102 that can identify a force feedback for an interaction detected by the trigger component 106. In particular, the system 400 relates to an example with a particular device for communicating interactions, wherein the device is a whiteboard device 402. The telepresence session 104 can include a local user 404 and a remote user 406, wherein each the local user 404 and the remote user 406 can be virtually represented within the telepresence session 104. Moreover, the whiteboard device 402 can be virtually represented as well as inputs, writing, drawings, etc. input by the local user 404.

The local user 404 can input onto the whiteboard device 402, wherein the input can be a marker stroke to write. The trigger component 106 can detect the interaction between the local user 404 and the whiteboard device 402, wherein such interaction can trigger the feedback component 102 to generate a corresponding force feedback. The force feedback can be communicated to the local user 404, wherein the force feedback can relate to pressure of writing on the whiteboard device 402, noise from the writing, vibration from writing, etc. Additionally, the local user 404 can receive such force feedback by the whiteboard device 402 and/or other devices (not shown but described in FIG. 2). It is to be appreciated that the remote user 406 can receive force feedback based upon the interaction with the whiteboard device 402. For example, the remote user 406 can receive noise, vibration, etc. based upon interaction with the whiteboard device 402 while the local user 404 inputs thereto.

Figure 5:
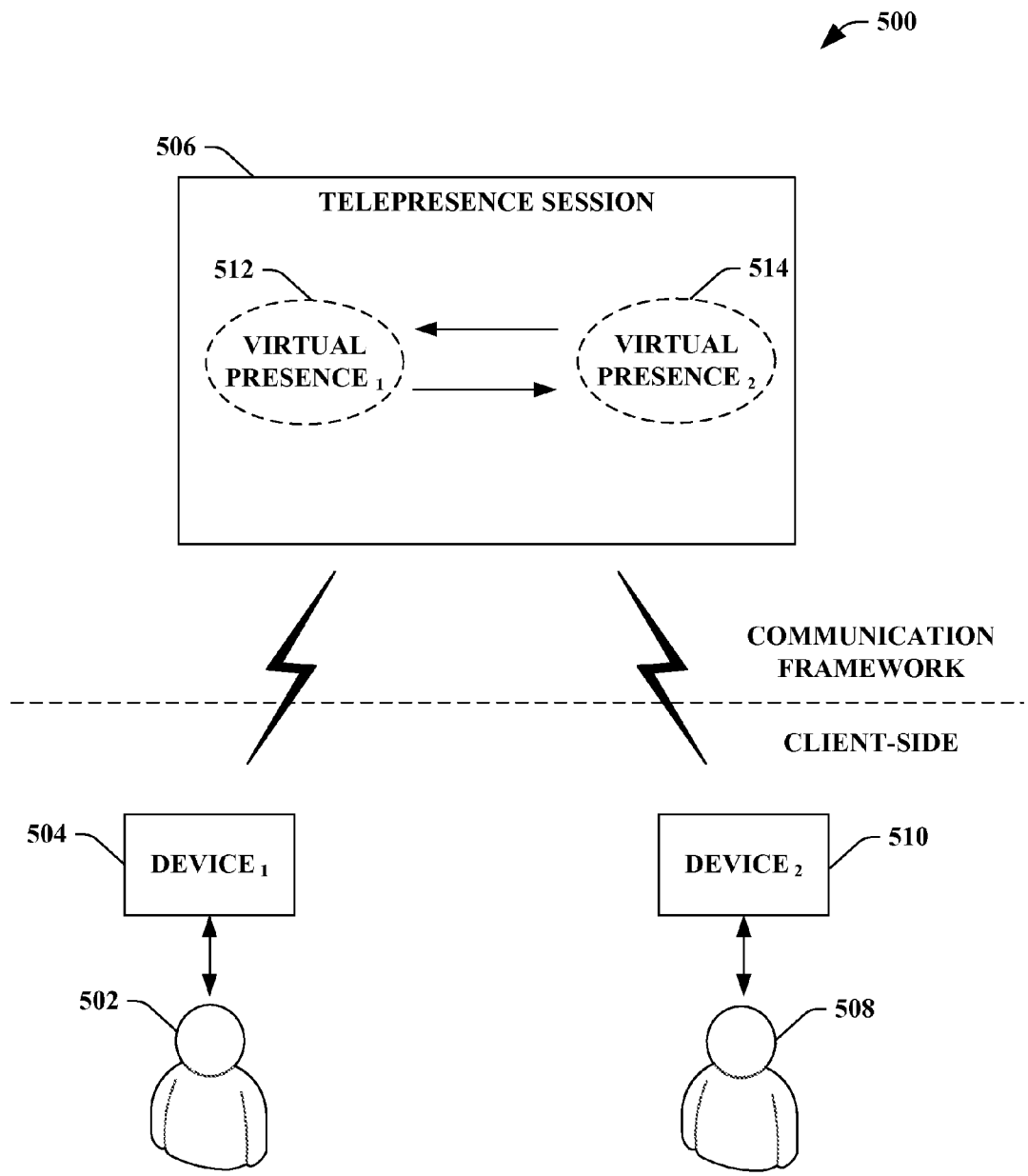
FIG. 5 illustrates a block diagram of exemplary system that facilitates enabling two or more virtually represented users to communicate within a telepresence session on a communication framework.

FIG. 5 illustrates a system 500 that facilitates enabling two or more virtually represented users to communicate within a telepresence session on a communication framework. The system 500 can include at least one physical user 502 that can leverage a device 504 on a client side in order to initiate a telepresence session 506 on a communication framework. Additionally, the user 502 can utilize the Internet, a network, a server, and the like in order to connect to the telepresence session 506 hosted by the communication framework. In general, the physical user 502 can utilize the device 504 in order to provide input for communications within the telepresence session 506 as well as receive output from communications related to the telepresence session 506. The device 504 can be any suitable device or component that can transmit or receive at least a portion of audio, a portion of video, a portion of text, a portion of a graphic, a portion of a physical motion, and the like. The device can be, but is not limited to being, a camera, a video capturing device, a microphone, a display, a motion detector, a cellular device, a mobile device, a laptop, a machine, a computer, etc. For example, the device 504 can be a web camera in which a live feed of the physical user 502 can be communicated for the telepresence session 506. It is to be appreciated that the system 500 can include a plurality of devices 504, wherein the devices can be grouped based upon functionality (e.g., input devices, output devices, audio devices, video devices, display/graphic devices, etc.).

The system 500 can enable a physical user 502 to be virtually represented within the telepresence session 506 for remote communications between two or more users or entities. The system 500 further illustrates a second physical user 508 that employs a device 510 to communicate within the telepresence session 506. As discussed, it is to be appreciated that the telepresence session 506 can enable any suitable number of physical users to communicate within the session. The telepresence session 506 can be a virtual environment on the communication framework in which the virtually represented users can communicate. For example, the telepresence session 506 can allow data to be communicated such as, voice, audio, video, camera feeds, data sharing, data files, etc. It is to be appreciated that the subject innovation can be implemented for a meeting/session in which the participants are physically located within the same location, room, or meeting place (e.g., automatic initiation, automatic creation of summary, etc.).

Overall, the telepresence session 506 can simulate a real world or physical meeting place substantially similar to a business environment. Yet, the telepresence session 506 does not require participants to be physically present at a location. In order to simulate the physical real world business meeting, a physical user (e.g., the physical user 502, the physical user 508) can be virtually represented by a virtual presence (e.g., the physical user 502 can be virtually represented by a virtual presence 512, the physical user 508 can be represented by a virtual presence 14). It is to be appreciated that the virtual presence can be, but is not limited to being, an avatar, an animated object, a video feed, an audio feed, a portion of a graphic, a portion of text, etc.

For instance, a first user can be represented by an avatar, wherein the avatar can imitate the actions and gestures of the physical user within the telepresence session. The telepresence session can include as second user that is represented by a video feed, wherein the real world actions and gestures of the user are communicated to the telepresence session. Thus, the first user can interact with the live video feed and the second user can interact with the avatar, wherein the interaction can be talking, typing, file transfers, sharing computer screens, hand-gestures, application/data sharing, etc.

Figure 6:
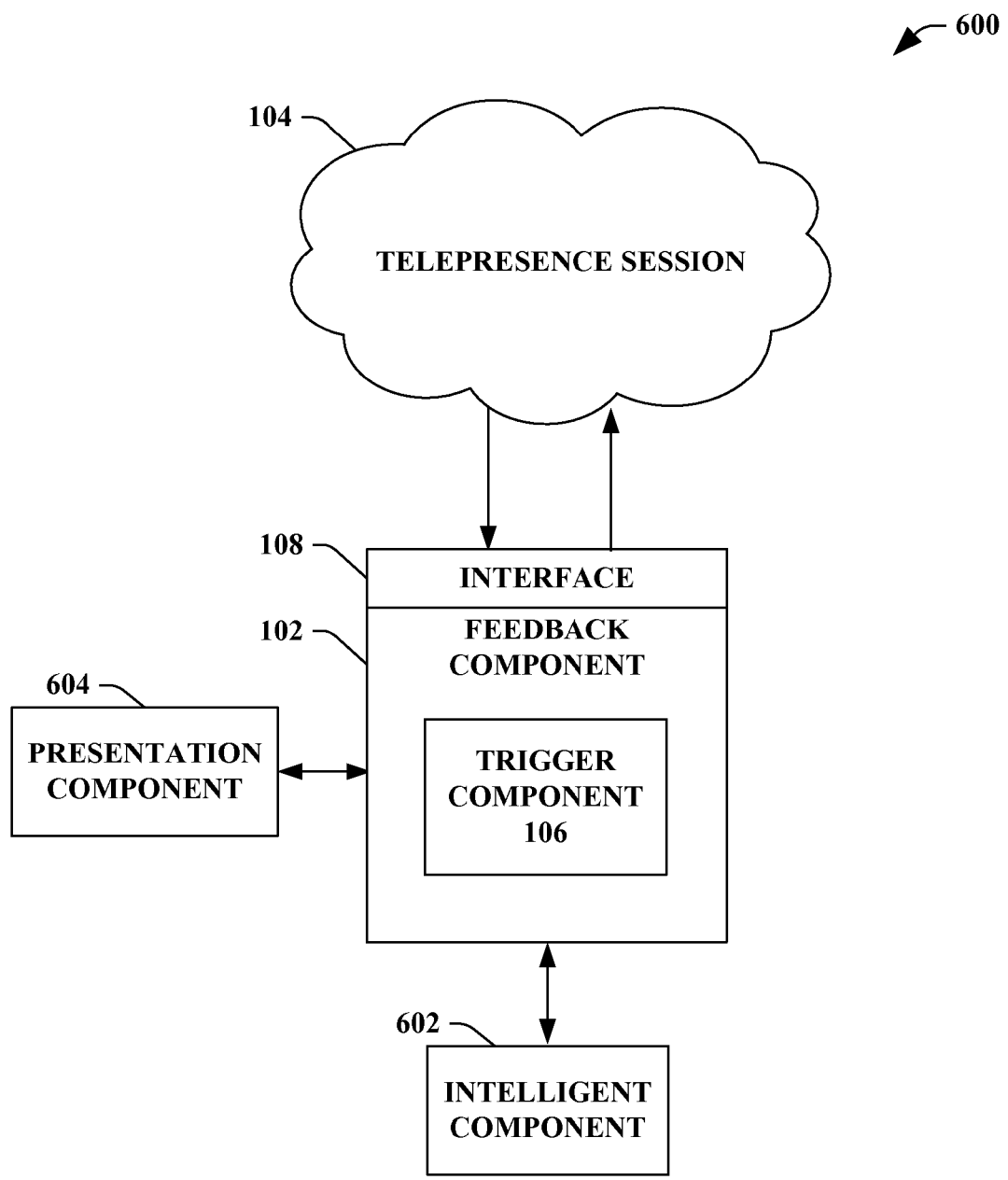
FIG. 6 illustrates a block diagram of an exemplary system that facilitates identifying a device to generate force feedback to a participant within a telepresence session.

FIG. 6 illustrates a system 600 that employs intelligence to facilitate automatically identifying a device to generate force feedback to a participant within a telepresence session. The system 600 can include the feedback component 102, the telepresence session 104, the trigger component 106, the interface 108, which can be substantially similar to respective components, sessions, and interfaces described in previous figures. The system 600 further includes an intelligent component 602. The intelligent component 602 can be utilized by the feedback component 102 and/or the trigger component 106 to facilitate automatically generating force feedback to a participant within a telepresence session based upon interaction with an object. For example, the intelligent component 602 can infer thresholds related to define a interaction with an object, type of interaction (e.g., data interaction, user to user interaction, event interaction, etc.), device selection for output of force feedback (e.g., optimal selection based upon outputs available, user-defined device availability, user preference for type of force feedback, etc.), type of force feedback for detected trigger (e.g., vibration, shaking, physical resistance, temperature change, motion, noise, etc.), user profile configurations (e.g., output devices, preferences, settings, etc.), device identification, etc.

The intelligent component 602 can employ value of information (VOI) computation in order to identify a device to output feedback and/or type of feedback for a detected interaction. For instance, by utilizing VOI computation, the most ideal and/or appropriate device and/or force feedback can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The feedback component 102 can further utilize a presentation component 604 that provides various types of user interfaces to facilitate interaction between a user and any component coupled to the feedback component 102. As depicted, the presentation component 604 is a separate entity that can be utilized with the feedback component 102. However, it is to be appreciated that the presentation component 604 and/or similar view components can be incorporated into the feedback component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the feedback component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
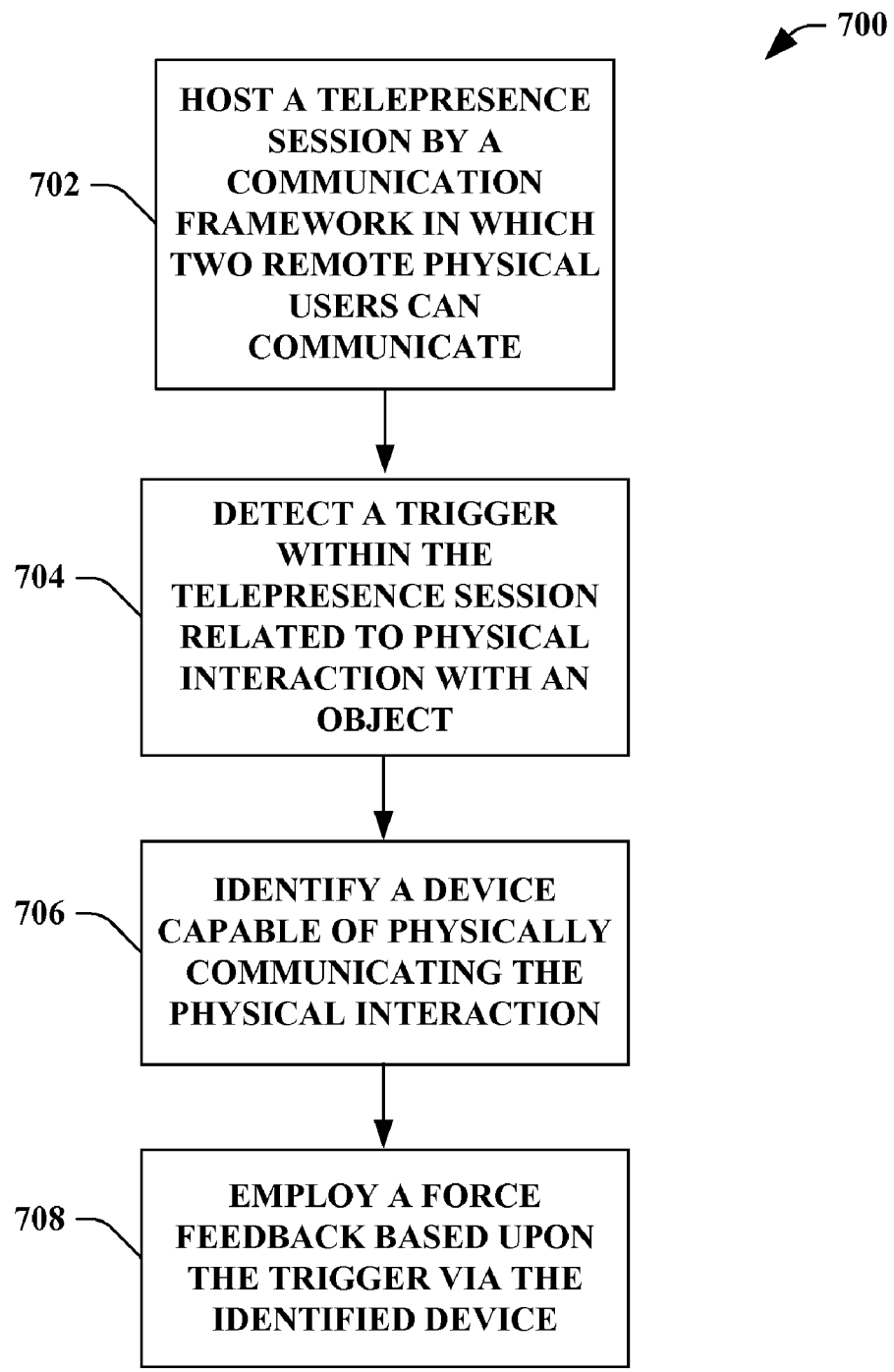
FIG. 7 illustrates an exemplary methodology for identifying a trigger to employ a force feedback within a telepresence session.

FIG. 7 illustrates a methodology and/or flow diagram in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates identifying a trigger to employ a force feedback within a telepresence session. At reference numeral 702, a telepresence session can be hosted by a communication framework in which two remote physical users can communicate. At reference numeral 704, a trigger within the telepresence session can be detected, wherein the trigger is related to a physical interaction with an object associated with the telepresence session. At reference numeral 706, a device with an output that is capable of physically communicating the physical interaction to at least one participant within the telepresence session can be identified. At reference numeral 708, a force feedback can be employed based upon the trigger via the identified device.

Figure 8:
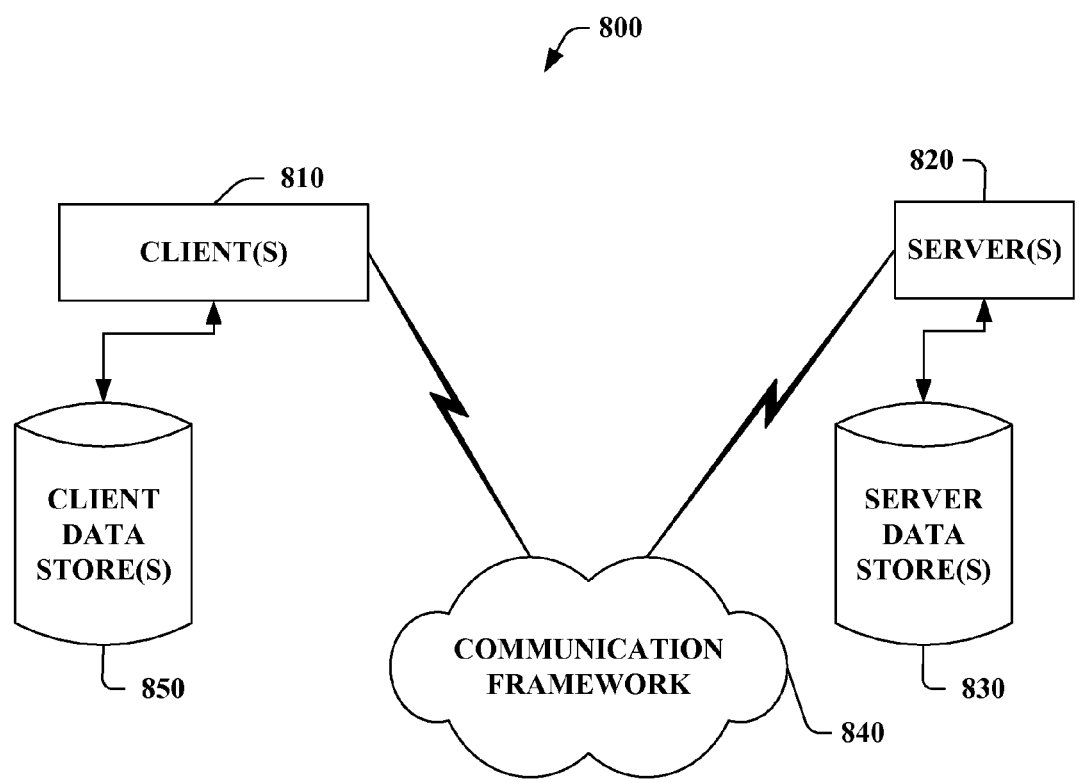
FIG. 8 illustrates an exemplary networking environment, wherein the novel aspects of the claimed subject matter can be employed.
Figure 9:
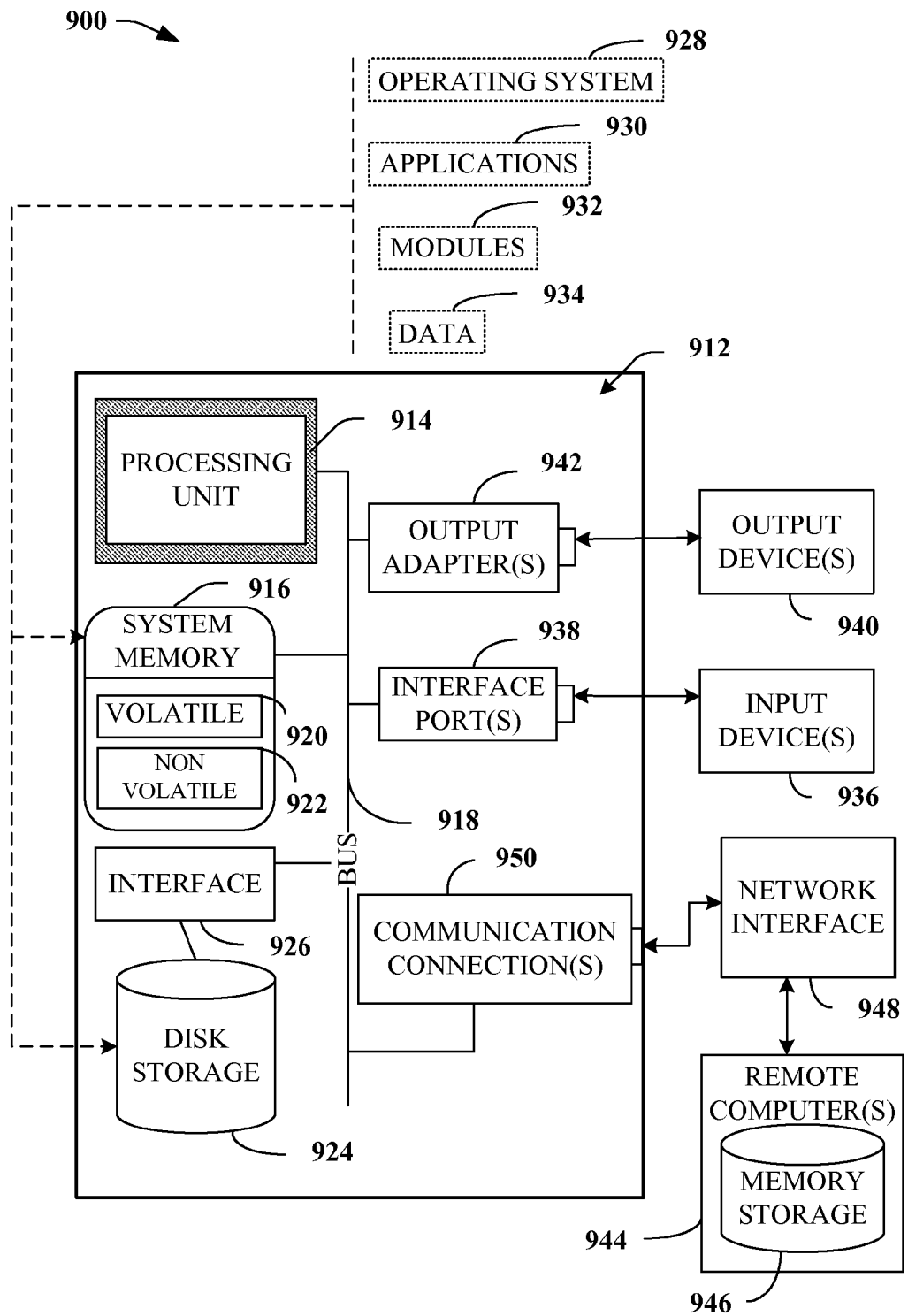
FIG. 9 illustrates an exemplary operating environment that can be employed in accordance with the claimed subject matter.

In order to provide additional context for implementing various aspects of the claimed subject matter, FIGS. 8-9 and the following discussion is intended to provide a brief, general description of a suitable computing environment in which the various aspects of the subject innovation may be implemented. For example, a feedback component that generates a force feedback response for an interaction within a telepresence session, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 8 is a schematic block diagram of a sample-computing environment 800 with which the claimed subject matter can interact. The system 800 includes one or more client(s) 810. The client(s) 810 can be hardware and/or software (e.g., threads, processes, computing devices). The system 800 also includes one or more server(s) 820. The server(s) 820 can be hardware and/or software (e.g., threads, processes, computing devices). The servers 820 can house threads to perform transformations by employing the subject innovation, for example.

One possible communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the servers 820.

With reference to FIG. 9, an exemplary environment 900 for implementing various aspects of the claimed subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), or flash memory. Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in the suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the claimed subject matter can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates replicating a telepresence session with a real world physical meeting, comprising:
   a telepresence session initiated within a communication framework that includes two or more virtually represented users that communicate therein;
   a trigger component that monitors the telepresence session in real time to identify a participant interaction with an object, wherein the object is at least one of a real world physical object or a virtually represented object within the telepresence session; and
   a feedback component that implements a force feedback to at least one participant within the telepresence session based upon the identified participant interaction with the object, wherein the force feedback is employed via a device associated with at least one participant.

2. The system of claim 1, the trigger component monitors activity within the telepresence session to trigger implementation of the force feedback, wherein the activity is at least one of a virtual presence location within the telepresence session, a virtual presence proximity to a virtually represented object, an interaction with a virtually represented object, an interaction with a physical object, a physical interaction, or a virtual interaction.

3. The system of claim 1, the participant interaction relates to at least one of a virtual user to a disparate virtual user, a physical user to a virtual user, a physical user to a disparate physical user, a virtual user to a portion of data, a physical user to a portion of data, a virtual user to a physical object, or a physical user to a physical object.

4. The system of claim 1, the trigger component identifies an intensity level of the interaction to which the feedback component implements the force feedback corresponding to such intensity level.

5. The system of claim 1, the feedback component evaluates two or more devices in order to identify at least one device to communicate the force feedback via an output associated with at least one device, wherein the evaluation is of a characteristic related to at least one of the two or more devices, the interaction, or the force feedback.

6. The system of claim 5, the feedback component selects a device to output the force feedback based upon evaluation of at least one of a device output capability, a user preference, a type of force feedback, an interaction detected, or an interaction intensity.

7. The system of claim 1, the feedback component generates the force feedback for an interaction with a portion of data, wherein the interaction with the portion of data triggers delivery of the portion of data.

8. The system of claim 1, the feedback component generates the force feedback for a detected event change related to the telepresence session.

9. The system of claim 8, wherein the event change is at least one of a mood change, a new topic being presented, a person leaving the telepresence session, a person entering the telepresence session, or an alert.

10. The system of claim 1, further comprising a profile component that manages at least one of a setting or a configuration related to at least one of the telepresence session, the force feedback, the device, or the interaction.

11. The system of claim 10, the profile component manages device selection to communicate the force feedback based upon a user preference.

12. The system of claim 10, the profile component enables a restriction that limits at least one of a received force feedback, a communicated force feedback to a user, an amount of devices used to output a received feedback, a type of force feedback received, or a type of force feedback communicated to a user.

13. The system of claim 10, the profile component enables a user-defined force feedback response to a detected interaction.

14. The system of claim 1, wherein the force feedback is at least one of a friction, a haptic, a tactile, an electric feedback, an electrical stimulation, a three-dimensional feedback, a shaking, a physical resistance, a temperature change, a motion, a noise, a pressure, a texture, a movement, or a replication of touching the object.

15. The system of claim 1, wherein the participant interaction relates to at least one of a virtual user to a disparate virtual user, a physical user to a virtual user, a physical user to a disparate physical user, a virtual user to a portion of data, a physical user to a portion of data, a virtual user to a physical object, or a physical user to a physical object.

16. The system of claim 1, wherein the device is at least one of a haptics device, a haptics glove, a pressure sensor device, a 3-dimensional (3D) camera, a speaker, a whiteboard, a whiteboard device, a vibration device, a heater, a motor, or a device that replicates a touching from a user.

17. A computer-implemented method that facilitates generating a force feedback to a participant within a telepresence session in order to replicate a physical interaction with an object, comprising:
   hosting a telepresence session by a communication framework in which two physical users can communicate;
   detecting a trigger within the telepresence session, wherein the trigger is related to a physical interaction with an object associated with the telepresence session;
   identifying a device with an output that is capable of physically communicating the physical interaction to at least one participant within the telepresence session; and
   employing a force feedback based upon the trigger via the identified device.

18. The method of claim 17, further comprising replicating an intensity of the physical interaction with an object with a corresponding amount of output from the device.

19. The method of claim 17, further comprising generating the force feedback for a detected event change related to the telepresence session, wherein the event change is at least one of a mood change, a new topic being presented, a person leaving the telepresence session, a person entering the telepresence session, or an alert.

20. One or more computer storage-media storing computer-executable instructions that, when executed, cause one or more processors to perform acts, comprising:

initiating a telepresence session within a communication framework that includes two or more virtually represented users that communicate therein;

monitoring the telepresence session in real time to identify a participant interaction with an object, wherein the object is at least one of a real world physical object or a virtually represented object within the telepresence session;

implementing a force feedback to at least one participant within the telepresence session based upon the identified participant interaction with the object, wherein the force feedback is employed via a device associated with at least one participant;

identifying an intensity level of the interaction to which such intensity level is translated in the force feedback via the device; and evaluating two or more devices in order to identify at least one device to communicate the force feedback via an output associated with at least one device, wherein the evaluation is of a characteristic related to at least one of the two or more devices, the interaction, or the force feedback.

* * * * *